Patented May 4, 1926.

1,583,681

UNITED STATES PATENT OFFICE.

PERCIVAL JOHN FRYER, OF TONBRIDGE, ENGLAND, ASSIGNOR TO McDOUGALL AND YALDING, LIMITED, OF YALDING, KENT, ENGLAND.

INSECTICIDE, SHEEP DIP, AND THE LIKE.

No Drawing.   Application filed November 29, 1924.   Serial No. 752,943.

*To all whom it may concern:*

Be it known that I, PERCIVAL JOHN FRYER, a British subject, and residing at Dry Bank House, Tonbridge, in the county of Kent, England, have invented certain new and useful Improvements in Insecticides, Sheep Dips, and the like, of which the following is a specification.

This invention relates to insecticides, sheep dips and the like, of the kind comprising an organic salt or salts, compound or compounds, obtained from the root, bark or other portions of the plants, bushes or trees of the Dalbergiæ tribe and Derris family and/or of perkakal.

The object of the present invention is to improve the composition of insecticides, sheep dips and the like of the above kind so that they may be advantageously employed with water of any degree of hardness and also with other washes or treating materials with which the animal, plant or the like may be required to be treated for the destruction of some pest other than that for which the particular insecticide or the like under consideration is to be employed.

The invention consists in a process for the production of insecticides, sheep dips, animal washes and the like which consists in mixing or incorporating with Derris i. e. with an organic salt or salts, compound or compounds obtained from the root, bark, or other portions of the plants, bushes or trees of the Dalbergiæ tribe and Derris family and/or of perkakal, a sulphonated fatty body, i. e. a sulphonated fatty oil, sulphonated sperm oil or a sulphonated wax as a vehicle or spreading or activating agent for such organic salt or salts, compound or compounds.

The invention also consists in a process of the above character according to which the active principles of the Derris are extracted by means of benzene or other volatile solvent after which the solvent is distilled off and the residue dissolved in the sulphonated oil or wax.

The invention also consists in insecticides, sheep dips, animal washes and the like produced by the herein described processes and other details hereinafter described or indicated.

In carrying my invention into effect in one convenient manner I employ any suitable process for extracting the active principles of the Derris (by which generic term i. e. by the term Derris I include an organic salt or salts, compound or compounds obtained from the root, bark or other portions of the plants, bushes or trees of the Dalbergiæ tribe and Derris family and/or of perkakal).

In order, however, to obtain the most satisfactory results in practice I extract the active principles of Derris by means of benzene or other suitable volatile solvent, and after having distilled off the solvent I dissolve the residue by the aid of gentle heat in the sulphonated oil or wax in the proportion necessary for effective working, which proportion I find generally to be in the neighbourhood of one part of the Derris extract to 10 to 50 parts of the sulphonated oil or wax although it is to be understood that the invention is not to be limited to the proportions given as any other proportion that is found suitable may be employed.

In a specific example in accordance with the invention I employ sulphonated castor oil, and in practice the sulphonation of the castor oil is preferably conducted at a low temperature (say not exceeding 40° C.) and by the use of acid which is of not too concentrated a form (say, for example, 94 per cent strength) and any free mineral acid must be removed from the sulphonated product by suitable treatment.

It is found that an insecticide or the like produced in the foregoing manner not only possesses all the advantages derived from the use of Derris but may also be employed with advantage with any other desired washes or treating materials and is suitable also for use with water of any degree of hardness. Thus, for example, the insecticides or the like are usable in water alone as a spraying solution for insect pests and will also mix with other spraying materials such, for example, as arsenate of lead and Bordeaux mixture.

If, however, it be desired to use the material in combination with lime-sulphur so as to produce a combined insecticide and fungicide it is found that a precipitate is almost immediately formed which prevents efficient spraying of the material. I find that this precipitation, however, can be prevented by the use of a certain proportion of one of the colloidal additional agents (of which casein is found most suitable) dissolved in the sulphonated oil-Derris mixture.

The casein is not readily soluble but if added in the powdered form to the sulphonated oil it will dissolve therein on gentle stirring and warming, and I find that from 5 to 20 per cent of casein added to the total mixture gives satisfactory results although I do not wish to confine myself to these proportions.

Another method I have found efficient is to add to the diluted sulphonated oil a proportion of a lime-sulphur insufficient to precipitate the whole of the insoluble matters which form when the sulphonated oil is added to the excess of lime-sulphur. The precipitate formed is filtered off, the liquor concentrated and such concentrate on being added to the lime-sulphur will give no precipitate but only a turbidity and the mixture will be found to be quite efficient for spraying purposes.

In some cases I may with advantage employ the calcium salts of sulphonated oils obtained, for example, by neutralizing the sulphonated oil with milk of lime or by treatment with calcium chloride or other soluble calcium salt or in any other suitable manner and such calcium salts may, if desired, be employed in solution in alcohol or ordinary methylated spirits.

The invention is not to be limited to any particular method adopted for producing the sulphonated oil and I may vary the ingredients employed with the proportions of same according to the purpose for which the material is required or any practical requirements that may have to be fulfilled.

It is to be noted that as indicated above where in the following claims the expression "Derris" occurs, it should be construed as meaning an organic salt or salts, compound or compounds obtained from the root, bark, or other portions of the plants, bushes or trees of the Dalbergiæ type and Derris family and (or) of perkakal, and the expression "sulphonated fatty body" is to be understood as meaning a sulphonated fatty oil, sulphonated sperm oil, a calcium salt of a sulphonated oil or a sulphonated wax.

I claim:—

1. A process for producing insecticides which comprises extracting the active principle of Derris by means of a volatile solvent, distilling off the solvent and dissolving the residiuum in a sulphonted fatty body.

2. A process for producing insecticides which comprises extracting the active principle of Derris by means of benzene, distilling off the benzene and dissolving the residuum in a sulphonated fatty body.

3. Insecticides comprising Derris and vehicle of a sulphonated fatty body.

4. Insecticides comprising Derris, and a vehicle comprising sulphonated castor oil.

5. An insecticide comprising Derris, a vehicle of a sulphonated fatty body and a colliodal addition agent.

In testimony whereof I have signed my name to this specification.

PERCIVAL JOHN FRYER.